US011326898B2

(12) United States Patent
Kuwahara et al.

(10) Patent No.: US 11,326,898 B2
(45) Date of Patent: May 10, 2022

(54) PARKING ASSIST APPARATUS AND PARKING ASSIST METHOD

(71) Applicant: CLARION CO., LTD., Saitama (JP)

(72) Inventors: Toshihisa Kuwahara, Saitama (JP); Takayuki Kaneko, Saitama (JP)

(73) Assignee: CLARION CO., LTD., Saitama (JP)

( * ) Notice: Subject to any disclaimer, the term of this patent is extended or adjusted under 35 U.S.C. 154(b) by 110 days.

(21) Appl. No.: 16/865,456

(22) Filed: May 4, 2020

(65) Prior Publication Data
US 2020/0408560 A1 Dec. 31, 2020

(30) Foreign Application Priority Data

Jun. 28, 2019 (JP) ............................. JP2019-122117

(51) Int. Cl.
| | | |
|---|---|---|
| *G01C 21/36* | (2006.01) | |
| *G01C 21/34* | (2006.01) | |
| *G08G 1/01* | (2006.01) | |
| *G08G 1/14* | (2006.01) | |

(52) U.S. Cl.
CPC ..... *G01C 21/3691* (2013.01); *G01C 21/3407* (2013.01); *G08G 1/0112* (2013.01); *G08G 1/141* (2013.01)

(58) Field of Classification Search
CPC ............ G01C 21/3691; G01C 21/3407; G08G 1/0112; G08G 1/141
See application file for complete search history.

(56) References Cited

U.S. PATENT DOCUMENTS

| | | | | |
|---|---|---|---|---|
| 10,242,576 | B2* | 3/2019 | Kume | G06V 20/586 |
| 10,748,033 | B2* | 8/2020 | Lai | G06K 9/6262 |
| 10,818,180 | B2* | 10/2020 | Indoh | G08G 1/143 |
| 10,832,064 | B2* | 11/2020 | Hirai | G06V 10/255 |

(Continued)

FOREIGN PATENT DOCUMENTS

| | | | | |
|---|---|---|---|---|
| EP | 1777144 A1 * | 4/2007 | | B60R 1/00 |
| EP | 1777144 A1 | 4/2007 | | |

(Continued)

OTHER PUBLICATIONS

European Office Action mailed by European Patent Office dated Jul. 28, 2021 in corresponding European patent application No. 20 182 347.3-1009.

(Continued)

*Primary Examiner* — Luis A Martinez Borrero
(74) *Attorney, Agent, or Firm* — IP Business Solutions, LLC

(57) ABSTRACT

A parking assist apparatus includes: a map generation unit that generates an obstacle map showing a position of an obstacle existing in a surrounding of own vehicle based on a detected result of a sonar, and records data indicating existence of the obstacle on the obstacle map; a wheel-stop detection unit that divides the obstacle map generated by the map generation unit into a plurality of areas, counts a number of data pieces in each of the plurality of divided areas, and detects a position of a wheel stop based on the counted number of data pieces in each of the plurality of areas; and a parking position setting unit that sets a parking position for parking the own vehicle based on the position of the wheel stop detected by the wheel-stop detection unit.

6 Claims, 13 Drawing Sheets

(56) References Cited

U.S. PATENT DOCUMENTS

| | | | |
|---|---|---|---|
| 11,024,174 B2* | 6/2021 | Cetin | B60R 1/00 |
| 11,137,256 B2* | 10/2021 | Cunha | G08G 1/148 |
| 2007/0088474 A1 | 4/2007 | Sugiura et al. | |
| 2013/0129199 A1* | 5/2013 | Russakovsky | G06V 10/25 |
| | | | 382/159 |
| 2013/0223686 A1* | 8/2013 | Shimizu | G06V 20/58 |
| | | | 382/103 |
| 2013/0345954 A1* | 12/2013 | Tashiro | G08G 1/00 |
| | | | 701/117 |
| 2014/0244070 A1* | 8/2014 | Inagaki | B62D 15/0285 |
| | | | 701/1 |
| 2014/0307922 A1* | 10/2014 | Kim | G06V 40/20 |
| | | | 382/104 |
| 2014/0309841 A1* | 10/2014 | Hara | G05D 1/0274 |
| | | | 701/26 |
| 2014/0333455 A1* | 11/2014 | Lee | B62D 15/027 |
| | | | 340/932.2 |
| 2015/0054661 A1* | 2/2015 | Noh | G08G 1/147 |
| | | | 340/932.2 |
| 2015/0073660 A1* | 3/2015 | Lee | G06V 20/586 |
| | | | 701/41 |
| 2015/0161457 A1* | 6/2015 | Hayakawa | H04N 13/106 |
| | | | 348/46 |
| 2015/0307089 A1* | 10/2015 | Vorobieva | B60W 30/06 |
| | | | 701/25 |
| 2015/0323785 A1* | 11/2015 | Fukata | G06T 7/73 |
| | | | 348/148 |
| 2016/0014406 A1* | 1/2016 | Takahashi | G01S 11/12 |
| | | | 348/148 |
| 2016/0075327 A1* | 3/2016 | Kiyokawa | B62D 15/0285 |
| | | | 701/301 |
| 2016/0267331 A1* | 9/2016 | Pillai | G06V 20/56 |
| 2017/0096167 A1* | 4/2017 | Yoon | G08G 1/143 |
| 2017/0334353 A1* | 11/2017 | Gillott | B62D 15/0285 |
| 2017/0356991 A1* | 12/2017 | Yosoku | G01S 13/60 |
| 2018/0300563 A1 | 10/2018 | Steinmeyer et al. | |
| 2018/0308364 A1* | 10/2018 | Kume | G06V 20/58 |
| 2018/0354504 A1* | 12/2018 | Kojo | G06V 10/44 |
| 2018/0357484 A1* | 12/2018 | Omata | G06V 20/582 |
| 2018/0362011 A1* | 12/2018 | Picron | B60W 10/02 |
| 2019/0073902 A1* | 3/2019 | Indoh | B62D 15/0285 |
| 2019/0215465 A1* | 7/2019 | Hayashi | H04N 7/18 |
| 2019/0258878 A1* | 8/2019 | Koivisto | G06V 20/584 |
| 2019/0265050 A1* | 8/2019 | Fujimoto | G09B 29/00 |
| 2020/0003565 A1* | 1/2020 | Cunha | G08G 1/143 |
| 2020/0090516 A1* | 3/2020 | Sert | G08G 1/143 |
| 2020/0104613 A1* | 4/2020 | Hirai | G06V 10/48 |
| 2020/0184260 A1* | 6/2020 | Lai | G06K 9/6262 |

FOREIGN PATENT DOCUMENTS

| | | |
|---|---|---|
| JP | 2010-123012 A | 6/2010 |
| JP | 2014-076696 A | 5/2014 |

OTHER PUBLICATIONS

Extended European Search Report mailed by European Patent Office dated Oct. 28, 2020 in corresponding European patent application No. 20182347.3-1009.

European Office Action mailed by European Patent Office dated Mar. 11, 2022 in corresponding European patent application No. 20 182 347.3-1009.

\* cited by examiner

PARKING ASSIST APPARATUS AND PARKING ASSIST METHOD

INCORPORATION BY REFERENCE

The present application claims priority under 35 U.S.C. § 119 to Japanese Patent Application No. 2019-122117 filed on Jun. 28, 2019. The content of the application is incorporated herein by reference in its entirety.

BACKGROUND OF THE INVENTION

Field of the Invention

The present invention relates to a parking assist apparatus and a parking assist method.

Description of the Related Art

Conventionally, there has been known a parking assist apparatus for assisting parking operations of drivers. For example, Japanese Patent Laid-Open No. 2014-76696 discloses a parking assist apparatus that detects positions of wheels on a front side of a parking space of a parked vehicle adjacent to own vehicle and positions of wheels on a far side thereof based on intensities of reflected waves of exploration waves emitted from a rear ranging sensor, determines the parking position of the own vehicle based on the detected positions of the wheels on the far side of the parking space, and assists the own vehicle to park at the determined parking position.

However, there may be obstacles such as a pillar, a fireplug, and the like placed in a parking lot, and it may not be preferable to park the own vehicle by aligning with the positions of the adjacent parked vehicles in such a case. Further, when there is a wheel stop placed in a stall, passengers may feel uncomfortable when the wheels strongly hits the wheel stop.

An aspect of the present invention is designed in view of the foregoing circumstances, and the object thereof is to allow a vehicle to park at a preferable position within a stall by corresponding to the parking environment.

SUMMARY OF THE INVENTION

In order to achieve the foregoing object, the parking assist apparatus according to an aspect of the present invention includes: a map generation unit that generates an obstacle map showing a position of an obstacle existing in a surrounding of a vehicle based on a detected result of a sensor equipped on the vehicle, and records data indicating existence of the obstacle on the obstacle map; a wheel-stop detection unit that divides the obstacle map generated by the map generation unit into a plurality of areas, counts a number of data pieces in each of the plurality of divided areas, and detects a position of a wheel stop based on the counted number of data pieces in each of the plurality of areas; and a parking position setting unit that sets a parking position for parking the vehicle based on the position of the wheel stop detected by the wheel-stop detection unit.

Further, the parking assist apparatus may include: an image acquisition unit that acquires a captured image of the surrounding of the vehicle; and a stall-line detection unit that detects stall lines showing a stall from the image acquired by the image acquisition unit and, from the detected stall lines, identifies a first stall line extending in a longitudinal direction of the stall, wherein the wheel-stop detection unit may divide the obstacle map into the plurality of areas in a direction orthogonal to an extending direction of the first stall line identified by the stall-line detection unit.

Further, the parking assist apparatus may include a provisional parking frame setting unit that sets a provisional parking frame for parking the vehicle based on the stall lines detected by the stall-line detection unit, wherein: the wheel-stop detection unit may set a detection range for detecting the wheel stop in a part of an area of the obstacle map based on a position of a frame line extending in a lateral direction of the stall out of the provisional parking frame set by the provisional parking frame setting unit, divide the set detection range into the plurality of areas, and count the number of data pieces in each of the plurality of divided areas to detect the position of the wheel stop.

Further, in the parking assist apparatus: when both ends of the first stall line in the longitudinal direction are detected, the provisional parking frame setting unit may set the provisional parking frame based on a first end at a distance farther from the vehicle out of the detected both ends; and when the first end cannot be detected, the provisional parking frame setting unit may set the provisional parking frame based on a second end at a distance closer to the vehicle.

Further, in the parking assist apparatus: when the wheel stop is detected by the wheel-stop detection unit, the provisional parking frame setting unit may correct the position of the provisional parking frame based on the detected position of the wheel stop; and the parking position setting unit may set the parking position based on the corrected provisional parking frame.

Further, the parking assist apparatus may include an obstacle detection unit that detects the obstacle based on at least one out of the image acquired by the image acquisition unit and the detected result of the sensor, wherein: when the obstacle is detected outside the set provisional parking frame and within a range in which a distance between the obstacle and the provisional parking frame is equal to or less than a set distance, the provisional parking frame setting unit may correct the position of the provisional parking frame such that the distance between the provisional parking frame and the detected obstacle becomes larger than the set distance; and the parking position setting unit may set the parking position based on the corrected provisional parking frame.

A parking assist method according to an aspect of the present invention includes: a map generation step of generating an obstacle map showing a position of an obstacle existing in a surrounding of a vehicle based on a detected result of a sensor equipped on the vehicle, and recording data indicating existence of the obstacle on the obstacle map; a wheel-stop detection step of dividing the obstacle map generated by the map generation step into a plurality of areas, counting a number of data pieces in each of the plurality of divided areas, and detecting a position of a wheel stop based on the counted number of data pieces in each of the plurality of areas; and a parking position setting step of setting a parking position for parking the vehicle based on the position of the wheel stop detected by the wheel-stop detection step.

Further, the parking assist method may include: an image acquisition step of acquiring a captured image of the surrounding of the vehicle; and a stall-line detection step of detecting stall lines showing a stall from the image acquired by the image acquisition step and, from the detected stall lines, identifying a first stall line extending in a longitudinal direction of the stall, wherein in the wheel-stop detection step, the obstacle map may be divided into the plurality of areas in a direction orthogonal to an extending direction of the first stall line identified by the stall-line detection step.

Further, the parking assist method may include a provisional parking frame setting step of setting a provisional parking frame for parking the vehicle based on the stall lines detected by the stall-line detection step, wherein: in the wheel-stop detection step, a detection range for detecting the wheel stop may be set in a part of an area of the obstacle map based on a position of a frame line extending in a lateral direction of the stall out of the provisional parking frame set by the provisional parking frame setting step, the set detection range may be divided into the plurality of areas, and the number of data pieces in each of the plurality of divided areas may be counted to detect the position of the wheel stop.

Further, in the parking assist method: when both ends of the first stall line in the longitudinal direction are detected, in the provisional parking frame setting step, the provisional parking frame may be set based on a first end at a distance farther from the vehicle out of the detected both ends; and when the first end cannot be detected, in the provisional parking frame setting step, the provisional parking frame may be set based on a second end at a distance closer to the vehicle.

Further, in the parking assist method: when the wheel stop is detected by the wheel-stop detection step, in the provisional parking frame setting step, the position of the provisional parking frame may be corrected based on the detected position of the wheel stop; and in the parking position setting step, the parking position may be set based on the corrected provisional parking frame.

Further, the parking assist method may include an obstacle detection step of detecting the obstacle based on at least one out of the image acquired by the image acquisition step and the detected result of the sensor, wherein: when the obstacle is detected outside the set provisional parking frame and within a range in which a distance between the obstacle and the provisional parking frame is equal to or less than a set distance, in the provisional parking frame setting step, the position of the provisional parking frame may be corrected such that the distance between the provisional parking frame and the detected obstacle becomes larger than the set distance; and in the parking position setting step, the parking position may be set based on the corrected provisional parking frame.

With the aspect of the present invention, it is possible to park the vehicle at a preferable position within the stall by corresponding to the parking environment.

DETAILED DESCRIPTION OF THE PREFERRED EMBODIMENT

Hereinafter, an embodiment of the present invention will be described by referring to the accompanying drawings.

Figure 1:
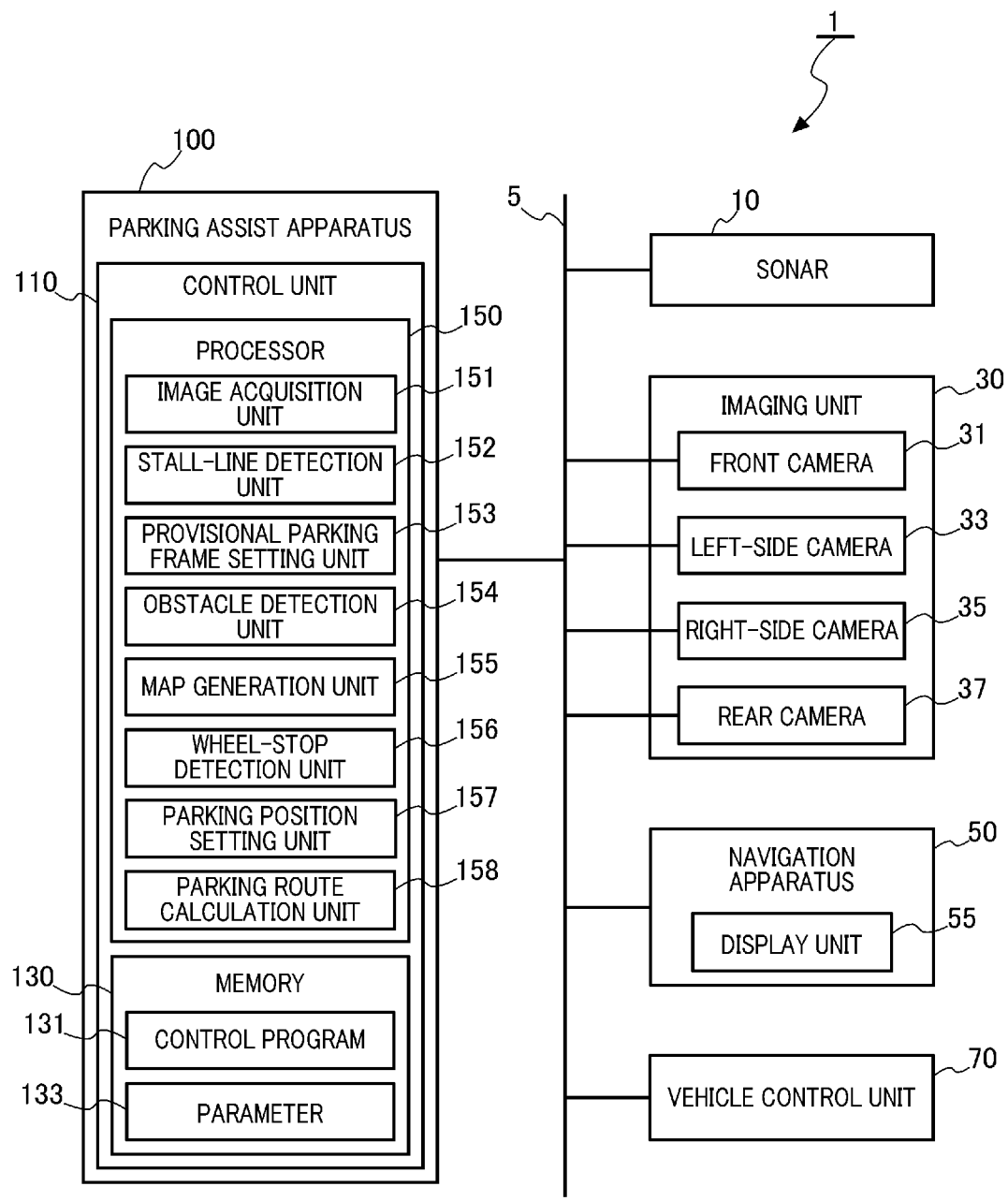
FIG. 1 is a diagram showing a configuration of a parking assist apparatus.

FIG. 1 is a diagram showing a configuration of a parking assist apparatus 100, and it is a diagram showing devices provided to a vehicle on which the parking assist apparatus 100 is equipped. Hereinafter, the vehicle on which the parking assist apparatus 100 is equipped is referred to as "own vehicle 1", and vehicles other than the own vehicle 1 are referred to as other vehicles. The own vehicle 1 is a vehicle that can travel by driving operations of a driver, and can travel by automatic drive controlled by a computer without the driving operations executed by the driver. The own vehicle 1 may be an engine-driven four-wheeled vehicle, a motor-driven electric vehicle, or a hybrid vehicle on which a motor and an engine are equipped, for example, and may also be a vehicle other than four-wheeled vehicles.

The own vehicle 1 includes a sonar 10, an imaging unit 30, a navigation apparatus 50, a vehicle control unit 70, and the parking assist apparatus 100. The sonar 10, the imaging unit 30, the navigation apparatus 50, the vehicle control unit 70, and the parking assist apparatus 100 are connected via a CAN (Controller Area Network) bus 5 to be able to perform data communication.

The sonar 10 is configured with an ultrasonic sonar, for example. The sonar 10 corresponds to the "sensor" of the present invention. A plurality of sonars 10 are provided in the own vehicle 1. For example, each of the sonars 10 is provided at the front right, front left, rear right, and rear left of the own vehicle 1. Each of the sonars 10 emits an ultrasonic wave toward a prescribed angle range of the surrounding of the own vehicle 1, and detects the distance and azimuth with respect to an obstacle 310 including another vehicle based on a time difference between the emission of the ultrasonic wave and reception of the wave reflected at the obstacle 310. The sonars 10 output the detected results to the parking assist apparatus 100.

The imaging unit 30 includes a front camera 31, a left-side camera 33, a right-side camera 35, and a rear camera 37. Each of the front camera 31, the left-side camera 33, the right-side camera 35, and the rear camera 37 includes an image sensor such as a CCD (Charge-Coupled Device) or a CMOS (Complementary Metal-Oxide-Semiconductor) and a data processing circuit that generates captured images from light reception states of the image sensor. View angles of the front camera 31, the left-side camera 33, the right-side camera 35, and the rear camera 37 are adjusted such that in the range of 360 degrees with respect to the own vehicle 1 images can be captured by the four cameras. The front camera 31, the left-side camera 33, the right-side camera 35, and the rear camera 37 capture images in respective imaging ranges at a prescribed frame rate and generate captured images.

Figure 2:
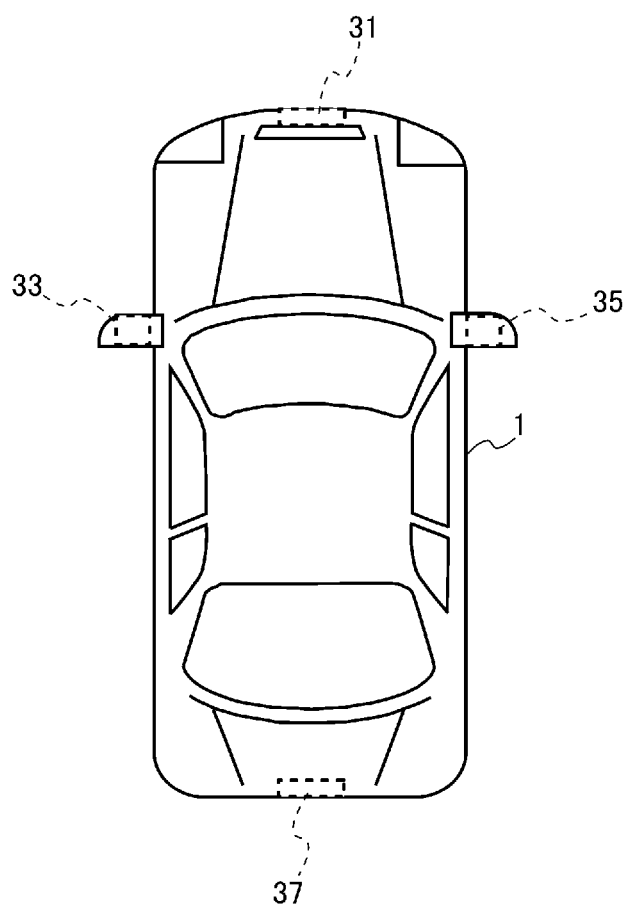
FIG. 2 is a diagram showing arrangement of an imaging unit.

FIG. 2 is a diagram showing the arrangement of the imaging unit 30.

The front camera 31 is attached at a top end of a front grille or a back surface of a rearview mirror inside the vehicle, for example, and captures images of the front side of the own vehicle 1 including a road surface at a prescribed frame rate. The front side of the own vehicle 1 is the direction toward a windshield from the driver seated on a driver seat.

The right-side camera 35 is attached to a right door mirror, for example, and captures images on the right-side face of the own vehicle 1 including the road surface at a prescribed frame rate. The left-side camera 33 is attached to a left door mirror, for example, and captures images on the left-side face of the own vehicle 1 including the road surface at a prescribed frame rate.

The rear camera 37 is attached to a release lever of a rear gate or a rear spoiler, for example, and captures images of the rear side of the own vehicle 1 including the road surface at a prescribed frame rate. The rear side of the own vehicle 1 is the opposite direction of the front side of the own vehicle 1, and it is the direction toward the rear windshield from the driver seated on the driver seat.

The number of cameras of the imaging unit 30 and the arrangement thereof are examples, and may be changed arbitrarily. That is, the number of cameras provided to the own vehicle 1 may be more or less as long as it is possible to capture images in the rage of 360 degrees with respect to the own vehicle 1.

The navigation apparatus 50 receives positioning signals from a GPS (Global Positioning System) satellite, and calculates the absolute position (latitude and longitude) of the own vehicle 1 based on the received positioning signals. Further, when a destination is inputted by a passenger of the own vehicle 1, the navigation apparatus 50 seeks for an optimum guidance route from the current position to the destination by taking traffic information and the like into consideration. Further, the navigation apparatus 50 includes a display unit 55 including a display, and displays the guidance route sought for by the navigation apparatus 50 and a guidance for the passenger on the display unit 55.

The vehicle control unit 70 includes for example, a CPU (Central Processing Unit), a ROM and a RAM, and executes a control program stored in the ROM or the like, when the own vehicle 1 travels inside a parking lot, the vehicle control unit 70 controls drive mechanisms such as the engine, steering wheel, brakes, and transmission to move the own vehicle 1 to the parking position calculated by the parking assist apparatus 100. At this time, the vehicle control unit 70 detects the obstacle 310 based on the detected results of the sonars 10 and the captured images of the imaging unit 30, and avoids a collision with the detected obstacle 310.

Further, when the own vehicle 1 travels on an ordinary road by automatic drive, the vehicle control unit 70 executes automatic drive controls such as a constant speed travel control, a follow-up travel control, a lane keeping control, a lane departure prevention control, and an overtaking control in addition to a collision prevention control.

In the parking lot, the parking assist apparatus 100 detects a stall 200 where the own vehicle 1 can be parked based on the detected results of the sonars 10 and the captured images of the imaging unit 30. Further, the parking assist apparatus 100 sets the parking position within the stall 200 for parking the own vehicle 1.

Next, the parking assist apparatus 100 will be described.

The parking assist apparatus 100 includes a control unit 110. The control unit 110 is configured with an ECU (Electronic Control Unit) that is a computer apparatus including a memory 130 and a processor 150.

The memory 130 includes a nonvolatile storage area for storing a control program 131 and parameters, and a volatile storage area used as an operation area of the processor 150. The nonvolatile storage area is configured with a ROM (Read Only Memory) or a flash memory, for example, and the volatile storage area is configured with a RAM (Random Access Memory), for example.

The processor 150 is an arithmetic processing unit configured with a CPU (Central Processing Unit) or an MPU (Micro Processing Unit). The processor 150 controls each unit of the parking assist apparatus 100 by executing the control program 131. The processor 150 may be configured with a single processor or may be configured with a plurality of processors. Further, the processor 150 may be configured with an SoC (System on Chip) in which a part of or a whole part of the memory 130 and other circuits are integrated. Further, the processor 150 may be configured with a combination of the CPU that executes the program and a DSP (Digital Signal Processor) that executes prescribed calculation processing. Furthermore, whole functions of the processor 150 may be mounted on hardware, or the processor 150 may be configured by using a programmable device.

As functional blocks, the control unit 110 includes an image acquisition unit 151, a stall-line detection unit 152, a provisional parking frame setting unit 153, an obstacle detection unit 154, a map generation unit 155, a wheel-stop detection unit 156, a parking position setting unit 157, and a parking route calculation unit 158. These functional blocks are the blocks showing the functions that are implemented by the processor 150 through performing calculations and control of data by executing instruction sets written in the control program 131.

The image acquisition unit 151 acquires captured images generated by the imaging unit 30. The image acquisition unit 151 acquires the captured images captured by the imaging unit 30 at a prescribed frame rate, and temporarily stores the acquired captured images in the memory 130.

Figure 3:
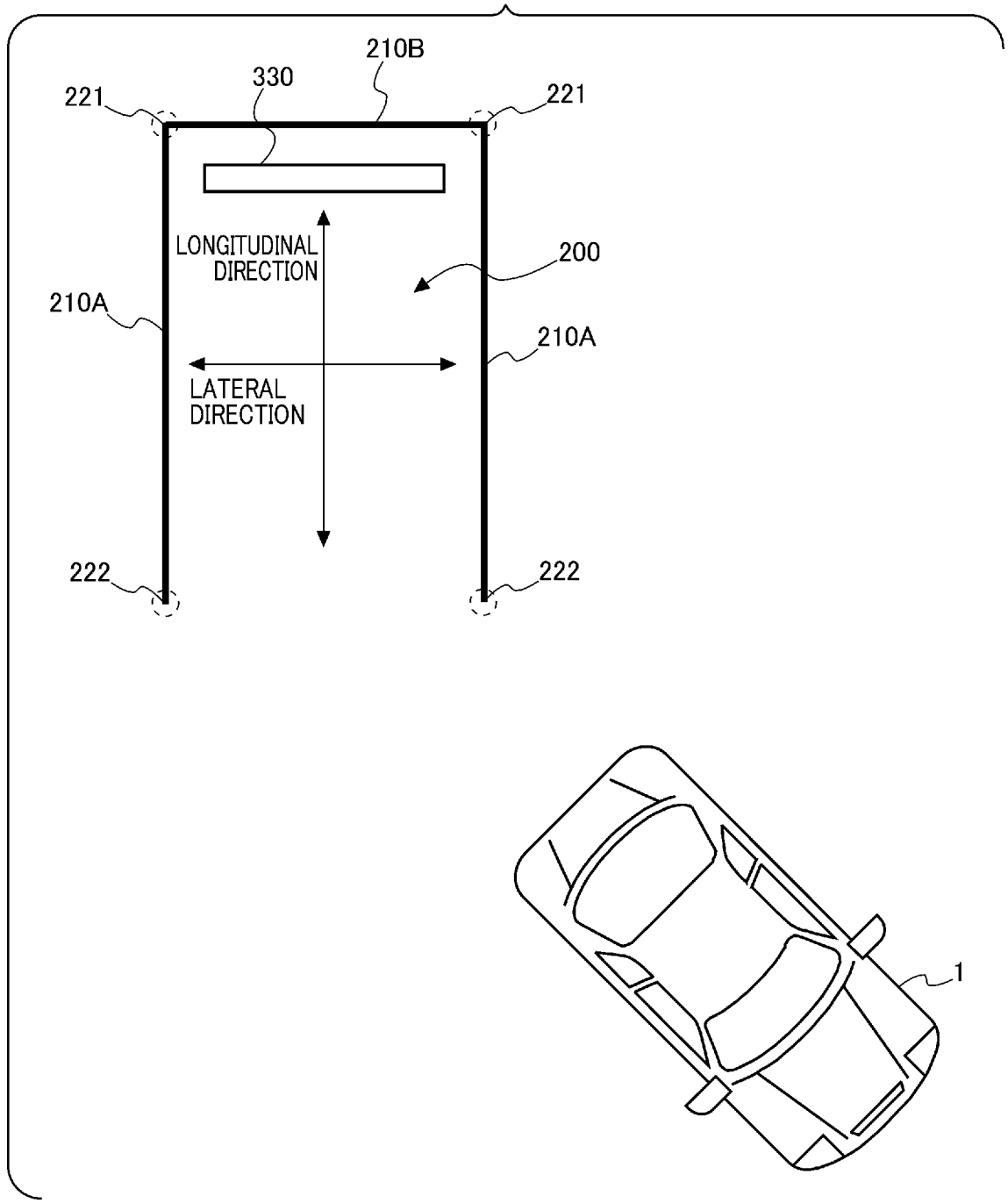
FIG. 3 is a diagram showing a stall.

FIG. 3 is a diagram showing the stall 200.

FIG. 3 shows a state where the stall 200 where no other vehicle is parked is detected from the detected results of the sonars 10 and the captured images of the imaging unit 30, and the own vehicle 1 has reached within a prescribed distance from the stall 200 by automatic drive. Further, FIG. 3 shows a state where the control unit 110 determines to park in the stall 200, and has the rear side of the own vehicle 1 facing toward the determined stall 200 side.

The stall-line detection unit 152 acquires the captured image of the rear camera 37 stored in the memory 130. The captured image of the rear camera 37 acquired by the stall-line detection unit 152 is the image captured under a state where the read side of the own vehicle 1 is facing toward the stall 200 side. The stall-line detection unit 152 analyzes the acquired captured image to detect a stall line 210.

In general, the road surface in the parking lot is paved with asphalt, and a loud colors such as white or yellow is used for the stall line 210. Therefore, there is a luminance difference between the road surface in the parking lot and the stall line 210. The amount of change in the luminance based on the luminance difference is within a specific range, so that the stall line 210 can be detected by extracting edges at which the amount of change in the luminance is within the specific range. The method for detecting the stall line 210 from the captured image is not limited to the method using the luminance difference but any other known methods may be used. For example, the stall-line detection unit 152 may perform edge extraction processing by executing image processing such as pattern matching on the captured image so as to detect the stall line 210.

As for the stall line 210 detected by the stall-line detection unit 152, there are a first stall line 210A and a second stall line 210B. The first stall line 210A is a stall line extending in a longitudinal direction of the stall 200, and the second stall line 210B is a stall line extending in the lateral direction of the stall 200.

Upon detecting the stall line 210, the stall-line detection unit 152 determines whether the detected stall line 210 is the first stall line 210A or the second stall line 210B.

For example, the stall-line detection unit 152 compares the length of the detected stall line 210 with a reference length set in advance to determine whether the detected stall line 210 is the first stall line 210A or the second stall line 210B. When the length of the stall line 210 is longer than the reference length, the stall-line detection unit 152 determines that the detected stall line 210 is the first stall line 210A. Meanwhile, when the length of the stall line 210 is shorter than the reference length, the stall-line detection unit 152 determines that the detected stall line 210 is the second stall line 210B.

Normally, the stall line 210 for sectioning a single stall 200 includes two first stall lines 210A. Therefore, when a single first stall line 210A is detected, the stall-line detection unit 152 detects the other first stall line 210A for sectioning the stall 200 from the captured image.

Further, as for the first stall line 210A detected by the stall-line detection unit 152 from the captured image, the whole first stall line 210A or a part of the first stall line 210A may be detected. In other words, in a case where the captured image does not include the whole first stall line 210A, the first stall line 210A detected by the stall-line detection unit 152 is not the whole part but a part of the first stall line 210A.

The provisional parking frame setting unit 153 calculates at least one of a first provisional parking frame 230A, a second provisional parking frame 230B, a third provisional parking frame 230C, and a fourth provisional parking frame 230D. Hereinafter, the first provisional parking frame 230A, the second provisional parking frame 230B, the third provisional parking frame 230C, and the fourth provisional parking frame 230D are denoted as a "provisional parking frame 230" when collectively referred to. The provisional parking frame 230 is an assumed parking frame.

The provisional parking frame setting unit 153 first calculates the first provisional parking frame 230A or the second provisional parking frame 230B based on ends of the first stall lines 210A detected by the stall-line detection unit 152 in the longitudinal direction. As shown in FIG. 3, in a state where the rear side of the own vehicle 1 is facing toward the stall 200 side, the end farther from the own vehicle 1 out of the ends of the first stall line 210A in the longitudinal direction is referred to as a first end 221, and the end closer to the own vehicle 1 is referred to as a second end 222.

When the stall-line detection unit 152 cannot detect the first ends 221 of the first stall lines 210A from the captured image, that is, when the stall-line detection unit 152 can detect only the second ends 222 but cannot detect the first ends 221, the provisional parking frame setting unit 153 calculates the first provisional parking frame 230A based on the second ends 222. There is a limit to the capturing range of the imaging unit 30 including the rear camera 37, so that there may be cases where the image of the whole stall 200 cannot be captured. Therefore, when the first ends 221 cannot be detected from the captured image, the provisional parking frame setting unit 153 calculates the first provisional parking frame 230A based on the second ends 222.

Figure 4:
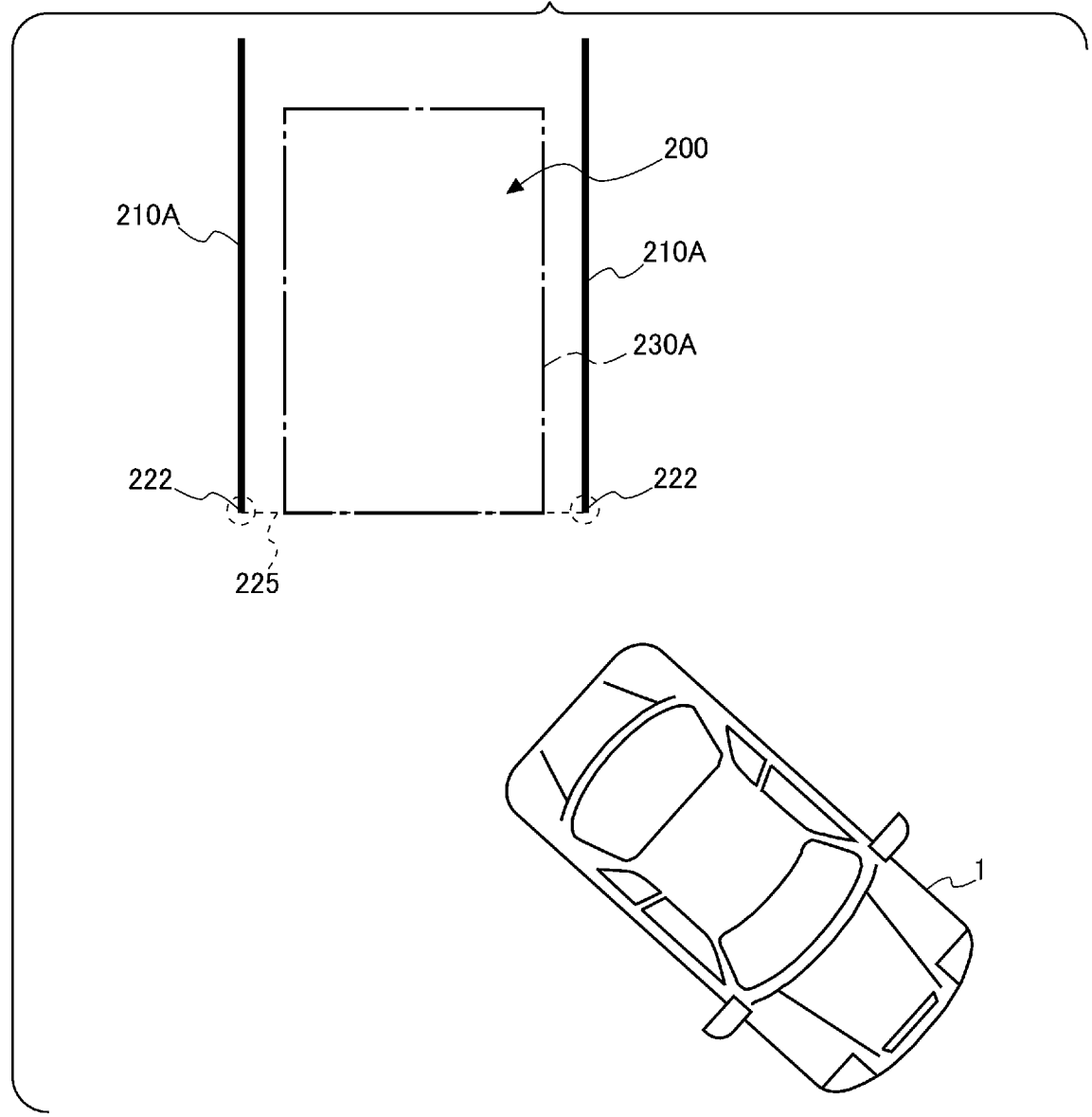
FIG. 4 is a diagram showing a setting example of a provisional parking frame.

FIG. 4 is a diagram showing the first provisional parking frame 230A.

The provisional parking frame setting unit 153 calculates the first provisional parking frame 230A such that the end of the first provisional parking frame 230A on the own vehicle 1 side matches a segment 225 that connects the second ends 222 of the two first stall lines 210A to each other. The sizes in the longitudinal direction and the lateral direction of the first provisional parking frame 230A are set based on the sizes in the longitudinal direction and the lateral direction of the own vehicle 1 stored in advance in the memory 130.

Figure 5:
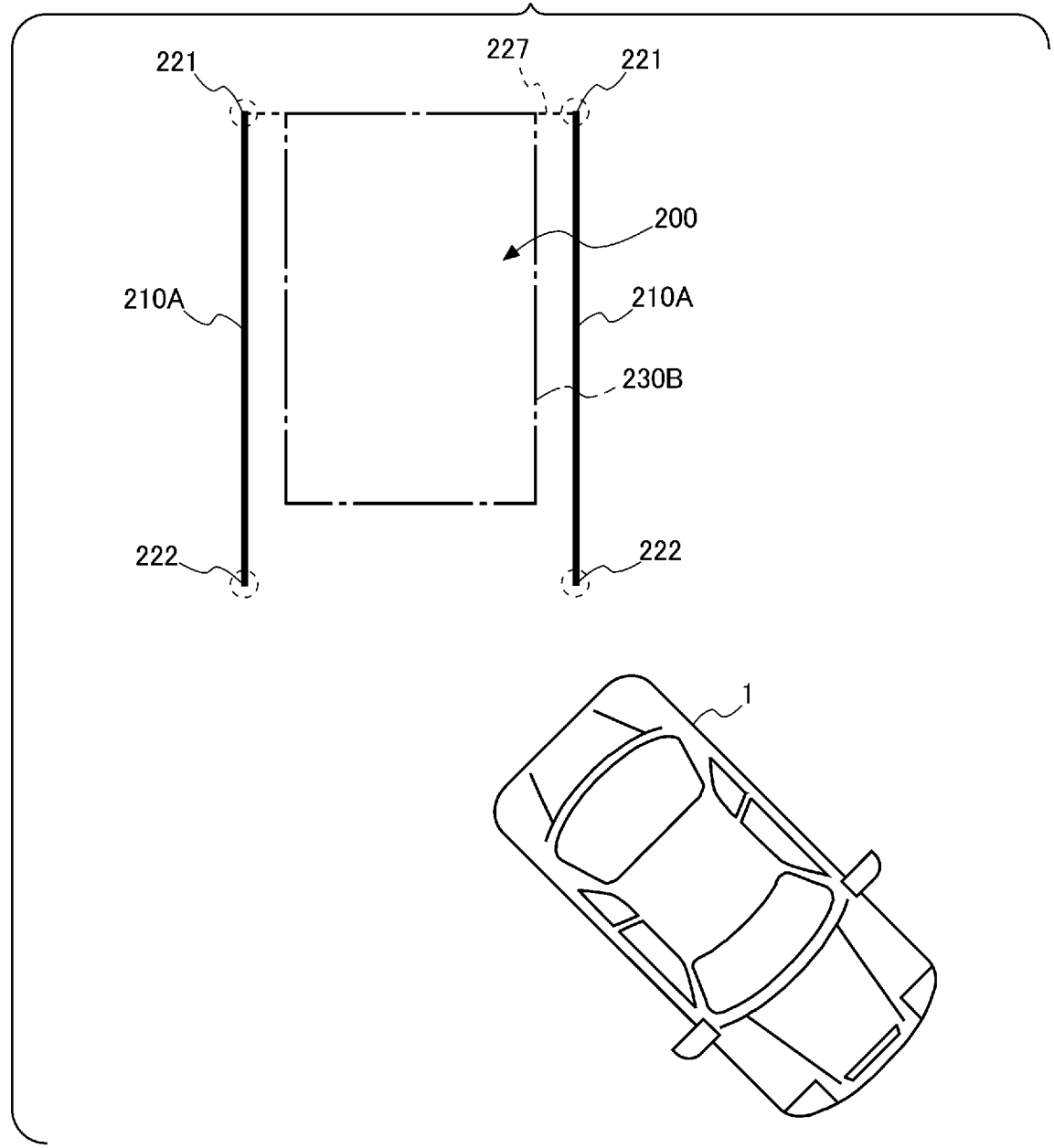
FIG. 5 is a diagram showing a setting example of a provisional parking frame.

FIG. 5 is a diagram showing a setting example of the second provisional parking frame 230B.

When the stall-line detection unit 152 detects the both ends of the first stall lines 210A from the captured image, that is, when the stall-line detection unit 152 detects the first ends 221 and the second ends 222, the provisional parking frame setting unit 153 calculates the second provisional parking frame 230B based on the first ends 221. The provisional parking frame setting unit 153 calculates the second provisional parking frame 230B such that the end of the second provisional parking frame 230B on the opposite side of the end on the own vehicle 1 side matches a segment 227 that connects the first ends 221 of the two first stall lines 210A to each other. Further, the sizes in the longitudinal direction and the lateral direction of the second provisional parking frame 230B are also set based on the sizes in the longitudinal direction and the lateral direction of the own vehicle 1 stored in advance in the memory 130.

Now, the obstacle detection unit 154 will be described.

The obstacle detection unit 154 detects the obstacle 310 existing in the surrounding of but outside the stall 200 based on the captured image of the imaging unit 30 and the detected results of the sonars 10. Specifically, the obstacle detection unit 154 detects the obstacle 310 such as a wall of a multistory carpark, a pillar, a fireplug, or the like located outside the stall 200.

The obstacle detection unit 154 determines, based on the captured image of the imaging unit 30 and the detected results of the sonars 10, whether or not the obstacle 310 exists outside the first provisional parking frame 230A or the second provisional parking frame 230B set by the provisional parking frame setting unit 153 and within a range in which a distance between the obstacle and the provisional parking frame is equal to or less than a set distance R1 between the obstacle 310 and the first provisional parking frame 230A or the second provisional parking frame 230B. The set distance R1 is set as a distance at which the rear gate contacts the obstacle 310 when the rear gate of the own vehicle 1 is opened, for example.

Figure 6:
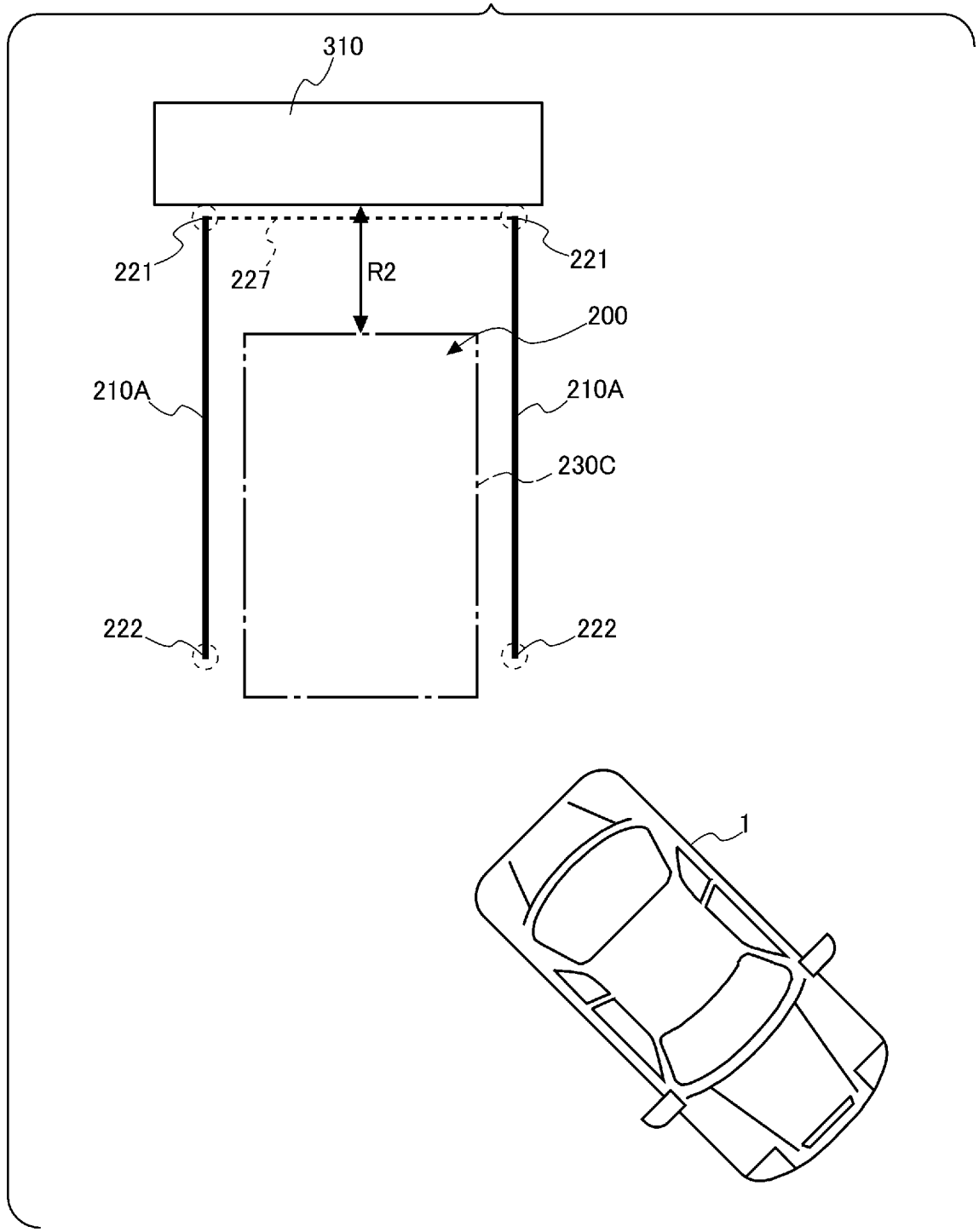
FIG. 6 is a diagram showing a setting example of a provisional parking frame.

FIG. 6 is a diagram showing the third provisional parking frame 230C.

There is described the third provisional parking frame 230C that is set by the provisional parking frame setting unit 153 when the obstacle 310 is detected by the obstacle detection unit 154. When the obstacle 310 is detected by the obstacle detection unit 154, the provisional parking frame setting unit 153 calculates the third provisional parking frame 230C. The provisional parking frame setting unit 153 calculates the third provisional parking frame 230C such that the distance between the third provisional parking frame 230C and the detected obstacle 310 becomes a distance R2 that has the larger value than the set distance R1. The third provisional parking frame 230C is calculated to have a larger distance between the third provisional parking frame 230C and the obstacle 310 than the set distance R1 in order to be able to open the rear gate and take out baggage when the own vehicle 1 is parked in the stall 200. FIG. 6 shows an example where the position of the third provisional parking frame 230C is calculated to have the distance R2 with respect to the obstacle 310.

Figure 7:
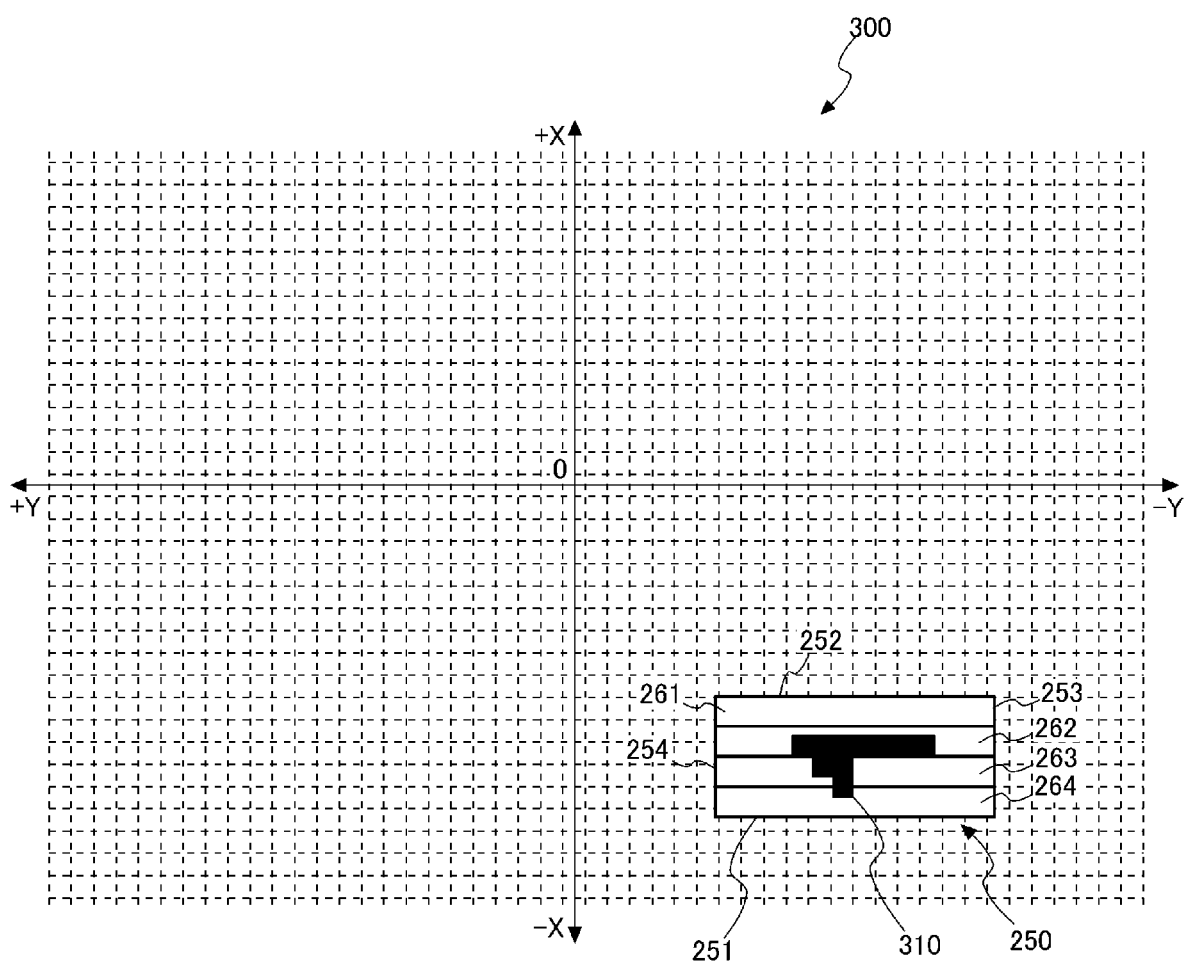
FIG. 7 is a chart showing an example of an obstacle map.
Figure 8:
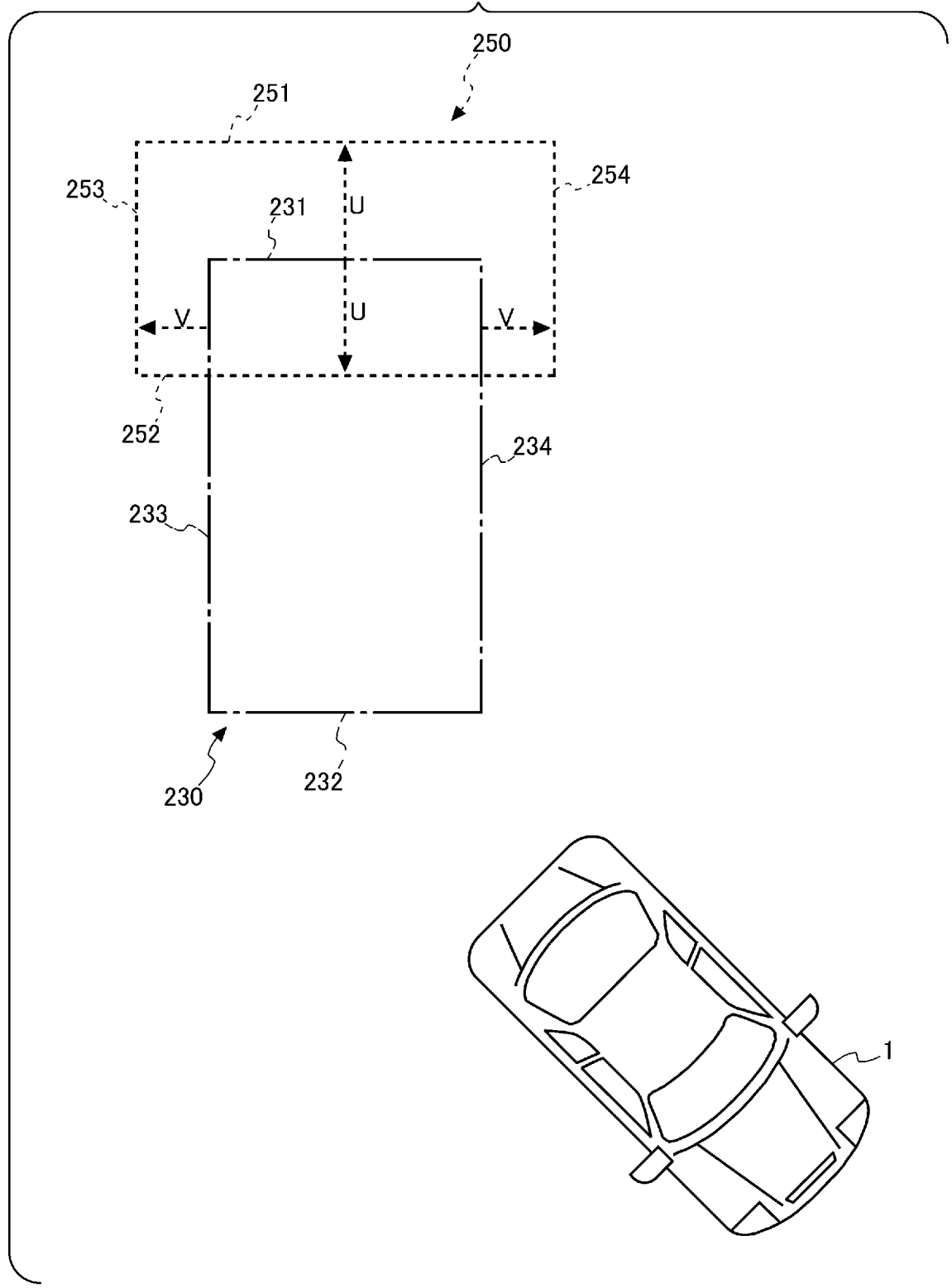
FIG. 8 is a diagram for describing a setting method of a detection range.

FIG. 7 is a chart showing an example of an obstacle map 300. Further, FIG. 8 is a diagram showing a setting method of a detection range 250. The obstacle map 300 shown in FIG. 7 is generated in the storage area of the memory 130, and the detection range 250 is set on the obstacle map 300.

The detected results of the sonars 10 are inputted to the map generation unit 155. The map generation unit 155 generates the obstacle map 300 shown in FIG. 7 based on the detected results of the sonars 10.

First, the map generation unit 155 sets the detection range 250 based on the provisional parking frame 230 calculated by the provisional parking frame setting unit 153. The detection range 250 is the target area for detecting the obstacle 310. When a plurality of the provisional parking frames 230 are calculated by the provisional parking frame setting unit 153, the map generation unit 155 selects one of the provisional parking frames 230, and sets the detection range 250 based on the selected provisional parking frame 230.

The setting method of the detection range 250 will be described by referring to FIG. 8.

The rectangular provisional parking frame 230 is configured with four frames that are an upper frame 231, a lower frame 232, a left frame 233, and a right frame 234. The map generation unit 155 sets the detection range 250 based on the upper frame 231, the left frame 233, and the right frame 234 of the provisional parking frame 230.

The left frame 233 and the right frame 234 are the frames parallel to the first stall lines 210A, and the left frame 233 is the frame on the left side of the provisional parking frame 230 when viewed from the own vehicle 1 side while the right frame 234 is the frame on the right side of the provisional parking frame 230 when viewed from the own vehicle 1 side. Further, the upper frame 231 and the lower frame 232 are the frames in the direction orthogonal to the first stall lines 210A, and the lower frame 232 is the frame closer to the own vehicle 1 while the upper frame 231 is the frame farther from the own vehicle 1.

The map generation unit 155 sets an upper side 251 and a lower side 252 of the detection range 250 at positions away from the upper frame 231 by a distance U. The upper side 251 is set in the direction leaving from the own vehicle 1 with respect to the upper frame 231. Further, the lower side 252 is set in the direction approaching the own vehicle 1 with respect to the upper frame 231.

Further, the map generation unit 155 sets a left side 253 of the detection range 250 at a position away from the left frame 233 by a distance V, and sets a right side 254 of the detection range 250 at a position away from the right frame 234 by the distance V. The left side 253 is set outside the left frame 233 at the position away from the left frame 233 by the distance V, and the right side 254 is set outside the right frame 234 at the position away from the right frame 234 by the distance V.

In the obstacle map 300 shown in FIG. 7, the detection range 250 and the obstacle 310 detected within the detection range 250 are shown. In the obstacle map 300, a coordinate system is set by having the front-and-rear direction of the own vehicle 1 as the Y-axis and the left-and-right direction as the X-axis with the own vehicle 1 being the origin. The map generation unit 155 records data in the obstacle map 300 based on the detected results of the sonar.

When the obstacle 310 is detected by the sonars 10, the map generation unit 155 records the data in the obstacle map 300 based on a positional relation (distance and azimuth) of the detected own vehicle 1 and the obstacle 310. More specifically, the map generation unit 155 records the data indicating existence of the obstacle 310 at the position on the obstacle map 300 corresponding to the position of the detected obstacle 310. The position on the obstacle map 300 specifically means the position of a storage cell of the memory 130 corresponding to the position of the obstacle map 300. In the embodiment, the value of the data of the corresponding storage cell on the obstacle map 300 is rewritten from "0" to "1". FIG. 7 shows that a solid-black area is the storage cells corresponding to the position of the obstacle 310. Further, the storage cells whose values are rewritten from "0" to "1" on the obstacle map 300 correspond to the shape of the detected obstacle 310.

The wheel-stop detection unit 156 detects a wheel stop 330 provided within the stall 200 based on the obstacle map 300 generated by the map generation unit 155.

When detecting the obstacle 310 of low height such as the wheel stop 330 by the captured image of the imaging unit 30 or by the sonars 10, the detection accuracy of the position may be deteriorated due to the influence of vibration of the own vehicle 1. Further, there is also a case where a flap board or the like of a pay-by-the-hour parking lot is placed in the stall 200, so that the flap board and the wheel stop 330 may be mistakenly detected in such a case. Therefore, the wheel-stop detection unit 156 generates a histogram based on the obstacle map 300, and detects the wheel stop 330 based on the generated histogram.

FIG. 9 to FIG. 12 are charts showing the histograms.

The wheel-stop detection unit 156 divides the detection range 250 set by the map generation unit 155 into N areas (N is any natural numbers). FIG. 7 shows a case where the detection range 250 is divided into four areas that are a first divided area 261, a second divided area 262, a third divided area 263, and a fourth divided area 264. The wheel stop 330 is provided to be in parallel to the lateral direction of the stall 200 as shown in FIG. 3. Therefore, the wheel-stop detection unit 156 divides the detection range 250 into a plurality of areas in the direction orthogonal to the first stall lines 210A detected by the stall-line detection unit 152.

After dividing the detection range 250 into the N divided areas, the wheel-stop detection unit 156 counts, by each of the divided areas, the number of storage cells where the data of value "1" is recorded, and generates a histogram. The wheel-stop detection unit 156 detects the position of the wheel stop 330 based on the generated histogram. The horizontal axis of the histograms 351 to 354 shown in FIG. 9 to FIG. 12 represents the coordinate, and the vertical axis thereof represents the counted number.

Figure 9:
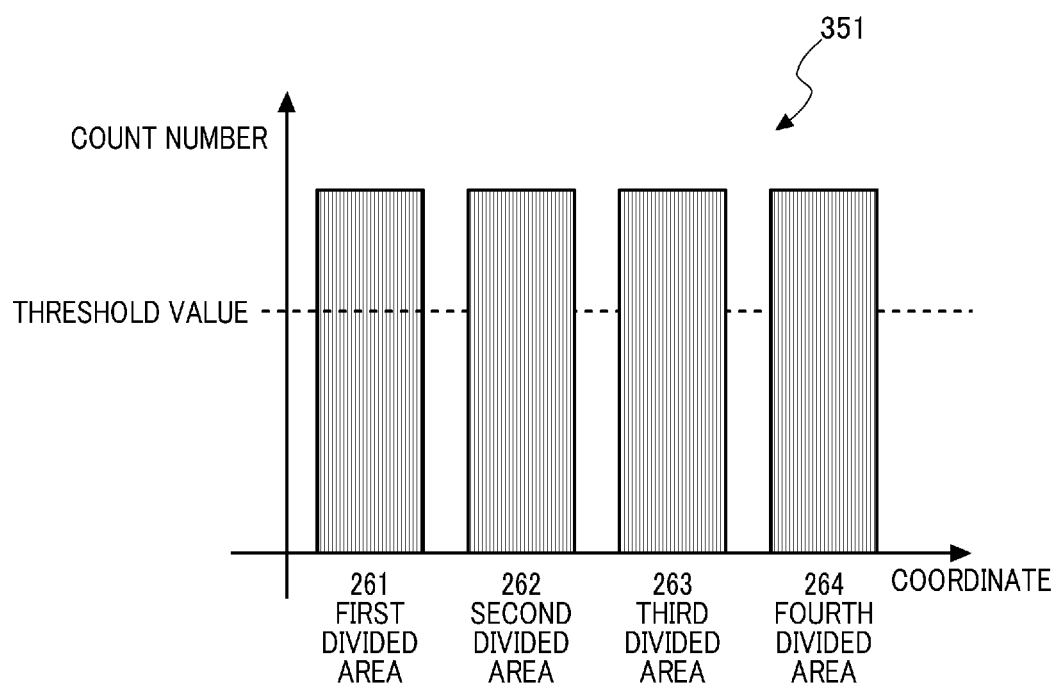
FIG. 9 is a chart showing a histogram.

The histogram 351 shown in FIG. 9 shows a case where the counted number is larger than a threshold value in all of the first divided area 261 to the fourth divided area 264. In this case, the wheel-stop detection unit 156 detects the first divided area 261 that is at the distance closest to the origin (own vehicle 1) as the position of the wheel stop 330.

Figure 10:
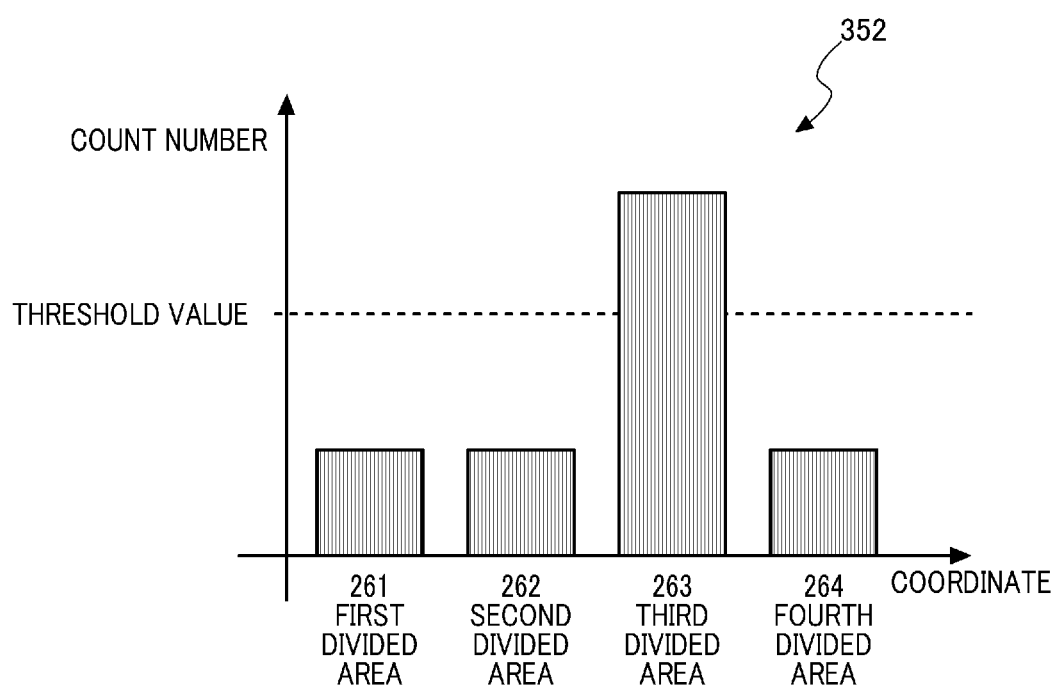
FIG. 10 is a chart showing a histogram.

Further, in the histogram 352 shown in FIG. 10, the number of cells where the data of value "1" is recorded is larger than the threshold value in the third divided area 263. When the histogram 352 in the shape shown in FIG. 10 is generated, the wheel-stop detection unit 156 determines the position of the third divided area 263 where the counted number is larger than the threshold value as the position of the wheel stop 330.

Figure 11:
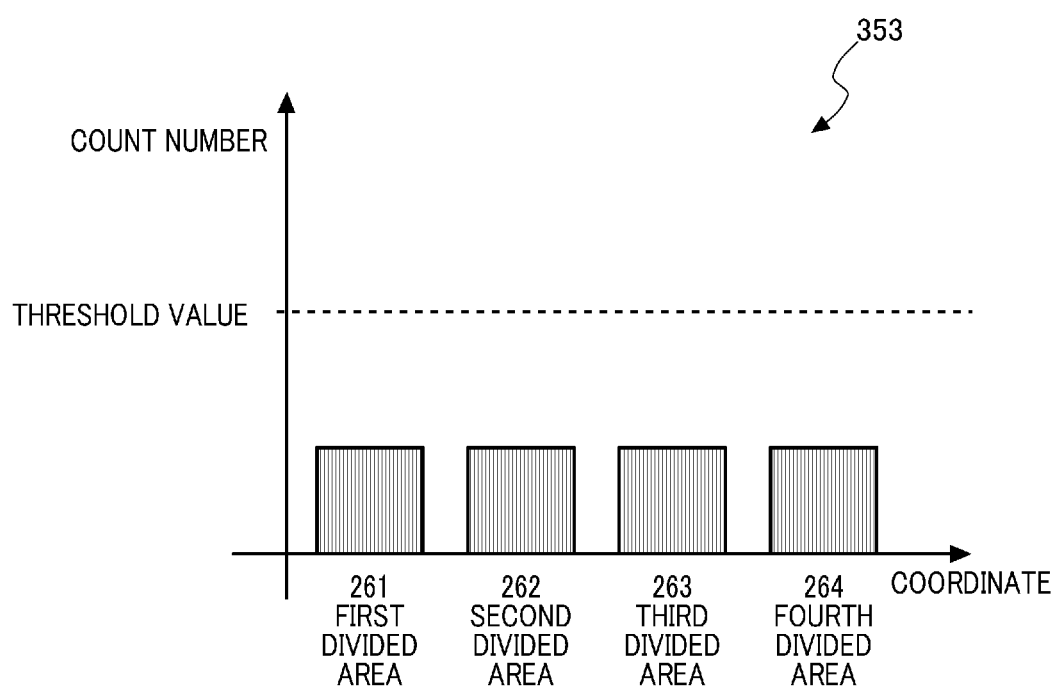
FIG. 11 is a chart showing a histogram.

Further, in the histogram 353 shown in FIG. 11, there is no divided area where the counted number is larger than the threshold value, and the counted number is substantially smaller than the threshold value. In this case, the wheel-stop detection unit 156 determines that the road surface of the stall 200 is detected as the obstacle 310, and determines that the wheel stop 330 is not included in the detection range 250.

Figure 12:
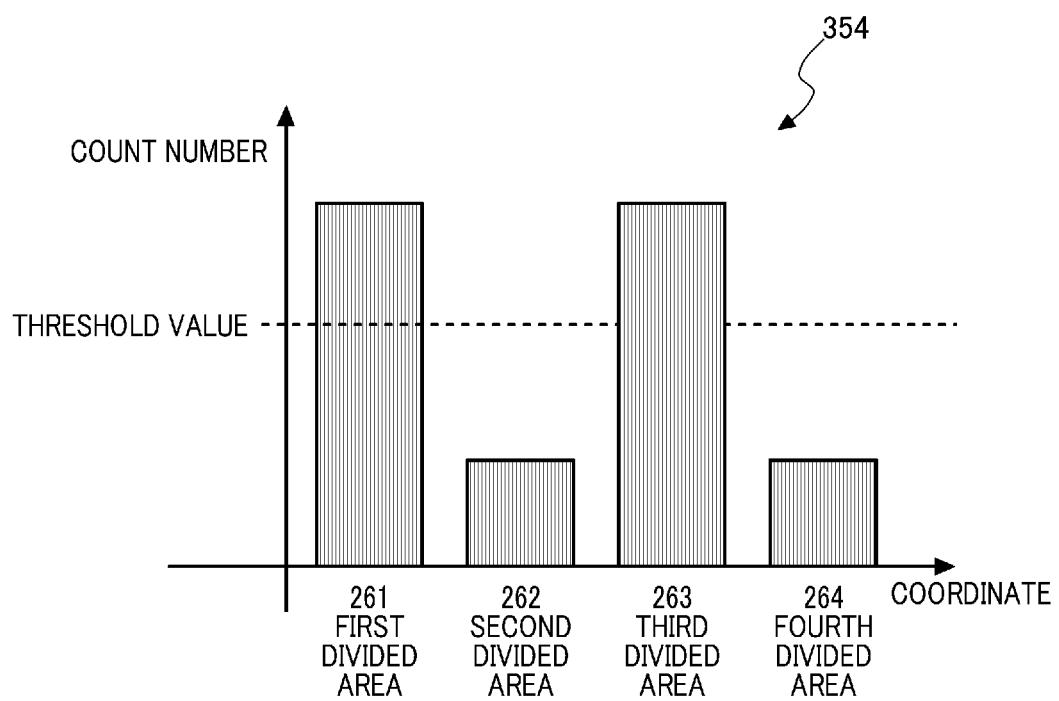
FIG. 12 is a chart showing a histogram.

Further, in the histogram 354 shown in FIG. 12, there are a mixture of the divided areas where the counted number is larger than the threshold value and the divided areas where the counted number is smaller than the threshold value. In this case, the wheel-stop detection unit 156 determines that the wheel stop 330 is not included in the detection range 250.

When the wheel stop 330 is detected by the wheel-stop detection unit 156, the provisional parking frame setting unit 153 calculates the position where the rear wheels of the own vehicle 1 contact the wheel stop 330 as the fourth provisional parking frame 230D.

When the provisional parking frame setting unit 153 calculates a plurality of provisional parking frames 230, the parking position setting unit 157 selects one of the plurality of provisional parking frames 230, and sets the parking position for parking the own vehicle 1 based on the selected provisional parking frame 230.

For example, in a case where the obstacle 310 is not detected by the obstacle detection unit 154 and the wheel stop 330 is not detected by the wheel-stop detection unit 156, the first provisional parking frame 230A or the second provisional parking frame 230B is calculated by the provisional parking frame setting unit 153. The parking position setting unit 157 sets the parking position for parking the own vehicle 1 based on the first provisional parking frame 230A or the second provisional parking frame 230B calculated by the provisional parking frame setting unit 153.

Further, in a case where the obstacle 310 is detected by the obstacle detection unit 154 and the wheel stop 330 is not detected by the wheel-stop detection unit 156, the first provisional parking frame 230A or the second provisional parking frame 230B, and the third provisional parking frame 230C are calculated by the provisional parking frame setting unit 153. In this case, the parking position setting unit 157 selects the provisional parking frame 230 at the distance closest to the own vehicle 1 from the first provisional parking frame 230A or the second provisional parking frame 230B, and the third provisional parking frame 230C. The parking position setting unit 157 sets the parking position for parking the own vehicle 1 based on the selected provisional parking frame 230. If the provisional parking frame 230 at the distance farther from the own vehicle 1 is selected, the own vehicle 1 may collide with the obstacle 310 or the wheels of the own vehicle 1 may strongly hit the wheel stop 330. Therefore, the parking position setting unit 157 selects the provisional parking frame 230 at the distance closest to the own vehicle 1.

Further, in a case where the obstacle 310 is not detected by the obstacle detection unit 154 and the wheel stop 330 is detected by the wheel-stop detection unit 156, the first provisional parking frame 230A or the second provisional parking frame 230B, and the fourth provisional parking frame 230D are calculated by the provisional parking frame setting unit 153. In this case, the parking position setting unit 157 also selects the provisional parking frame 230 at the distance closest to the own vehicle 1 from the first provisional parking frame 230A or the second provisional parking frame 230B, and the fourth provisional parking frame 230D. The parking position setting unit 157 sets the parking position for parking the own vehicle 1 based on the selected provisional parking frame 230. The reason why the parking position setting unit 157 selects the provisional parking frame 230 at the distance closest to the own vehicle 1 is the same as the reason described above.

Further, in a case where the obstacle 310 is detected by the obstacle detection unit 154 and the wheel stop 330 is detected by the wheel-stop detection unit 156, the first provisional parking frame 230A or the second provisional parking frame 230B, and the third provisional parking frame 230C as well as the fourth provisional parking frame 230D are calculated by the provisional parking frame setting unit 153. In this case, the parking position setting unit 157 selects the provisional parking frame 230 at the distance closest to the own vehicle 1 from the first provisional parking frame 230A or the second provisional parking frame 230B, and the third provisional parking frame 230C as well as the fourth provisional parking frame 230D. The parking position setting unit 157 sets the parking position for parking the own vehicle 1 based on the selected provisional parking frame 230. The reason why the parking position setting unit 157 selects the provisional parking frame 230 at the distance closest to the own vehicle 1 is the same as the reason described above.

In the explanations above, the provisional parking frame setting unit 153 calculates the third provisional parking frame 230C when the obstacle 310 is detected by the obstacle detection unit 154, and the provisional parking frame setting unit 153 calculates the fourth provisional parking frame 230D when the wheel stop 330 is detected by the wheel-stop detection unit 156.

Other than such actions, the provisional parking frame setting unit 153 may calculate either one of the third provisional parking frame 230C and the fourth provisional parking frame 230D based on the detected results of the obstacle detection unit 154 and the wheel-stop detection unit 156. In such a case, a priority may be set between the third provisional parking frame 230C and the fourth provisional parking frame 230D. For example, the priority of the fourth provisional parking frame 230D may be set higher than that of the third provisional parking frame 230C. The priority is set on an assumption that the wheel stop 330 is placed by considering the distance between the wheel stop 330 and the obstacle 310. The provisional parking frame setting unit 153 calculates the fourth provisional parking frame 230D that is of the highest priority in a case where the obstacle 310 is detected by the obstacle detection unit 154 and the wheel stop 330 is detected by the wheel-stop detection unit 156 and in a case where the obstacle 310 cannot be detected by the obstacle detection unit 154 and the wheel stop 330 is detected by the wheel-stop detection unit 156. Further, the provisional parking frame setting unit 153 calculates the third provisional parking frame 230C that is of the second highest priority in a case where the obstacle 310 is detected by the obstacle detection unit 154 and the wheel stop 330 cannot be detected by the wheel-stop detection unit 156.

Further, the priority of the fourth provisional parking frame 230D and the third provisional parking frame 230C may be set higher than the priority of the first provisional parking frame 230A and the second provisional parking frame 230B. There is no priority set between the third provisional parking frame 230C and the fourth provisional parking frame 230D. Similarly, there is no priority set between the first provisional parking frame 230A and the second provisional parking frame 230B.

In this case, when the obstacle 310 is detected by the obstacle detection unit 154, the provisional parking frame setting unit 153 corrects the position of the calculated first provisional parking frame 230A or second provisional parking frame 230B to calculate the third provisional parking frame 230C. Because the low-priority first provisional parking frame 230A or second provisional parking frame 230B is not to be used, the third provisional parking frame 230C may be calculated by correcting the position of the first provisional parking frame 230A or the second provisional parking frame 230B. Further, when the wheel stop 330 is detected by the wheel-stop detection unit 156, the provisional parking frame setting unit 153 corrects the position of the calculated first provisional parking frame 230A or second provisional parking frame 230B to calculate the fourth provisional parking frame 230D. Then, when the third provisional parking frame 230C and the fourth provisional parking frame 230D are calculated, the provisional parking frame setting unit 153 compares the positions of the third provisional parking frame 230C and the fourth provisional parking frame 230D, and selects the provisional parking frame 230 at the distance closer to the own vehicle 1.

The parking route calculation unit 158 calculates a parking route that is a route along which the own vehicle 1 moves from the current position to the parking position set by the parking position setting unit 157. The parking route calculation unit 158 outputs the calculated parking route to the vehicle control unit 70. The vehicle control unit 70 controls the drive mechanisms such as the engine, steering wheel, brakes, and transmission such that the own vehicle 1 travels along the inputted parking route.

Further, the control unit 110 generates a display image by superposing the parking route calculated by the parking route calculation unit 158 and the parking position set by the parking position setting unit 157 on the captured image of the imaging unit 30, and outputs the generated display image to the navigation apparatus 50. The navigation apparatus 50 displays the inputted display image on the display unit 55. Further, the control unit 110 may generate the display image at a timing at which the whole stall 200 comes to be captured by the rear camera 37, such as a timing at which the wheel stop 330 and the first ends 221 of the first stall lines 210A are detected from the captured image of the rear camera 37, and may output the generated display image to the navigation apparatus 50. Further, when the wheel stop 330 is detected by the wheel-stop detection unit 156, the control unit 110 may display a guidance for notifying that the wheel stop 330 is detected on the display unit 55 of the navigation apparatus 50.

Further, when an instruction operation for displaying another candidate of a parking position is received via an operation unit (not shown) of the navigation apparatus 50, the parking position setting unit 157 sets a parking position based on an unselected provisional parking frame 230 that is another provisional parking frame 230 that has already been calculated by the provisional parking frame setting unit 153. The parking route calculation unit 158 calculates a parking route to the set parking position. Then, the control unit 110 may generate a display image acquired by superposing the parking route and the parking position on the captured image of the imaging unit 30, and may output the generated display image to the navigation apparatus 50.

Figure 13:
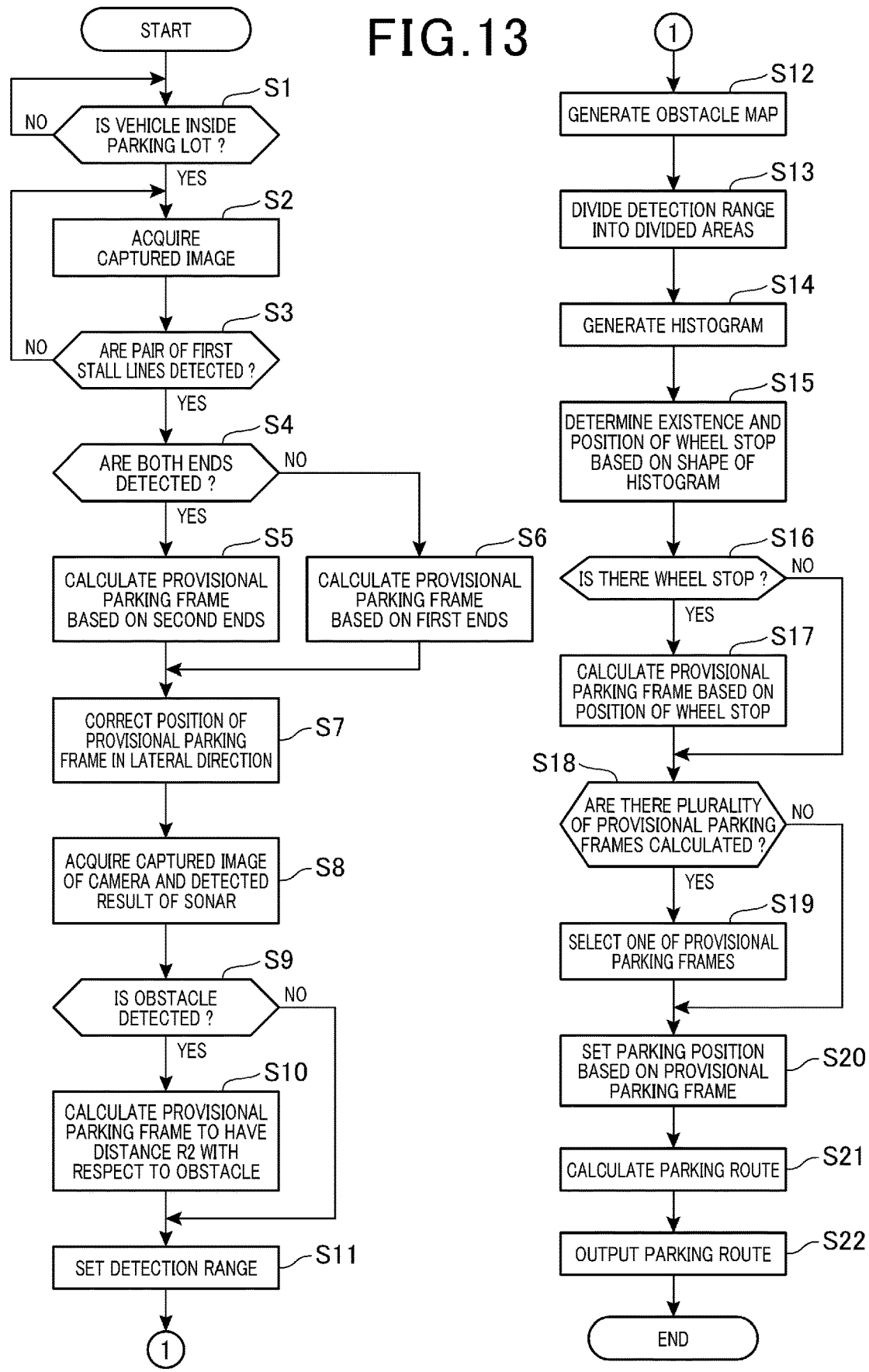
FIG. 13 is a flowchart showing actions of the parking assist apparatus.

FIG. 13 is a flowchart showing actions of the parking assist apparatus 100.

The actions of the parking assist apparatus 100 will be described by referring to the flowchart shown in FIG. 13.

First, the control unit 110 determines whether or not the own vehicle 1 has entered the parking lot (step S1).

For example, the control unit 110 determines whether or not the own vehicle 1 has entered the parking lot based on a signal inputted from the navigation apparatus 50. When the own vehicle 1 has not entered the parking lot (NO in step S1), the control unit 110 stands by without executing processing until it is determined that the own vehicle 1 has entered the parking lot.

Further, when the own vehicle 1 enters the parking lot (YES in step S1), the control unit 110 acquires the captured image of the rear camera 37 from the memory 130 (step S2). Step S2 corresponds to the "image acquisition step" of the present invention. The control unit 110 analyzes the acquired captured image of the rear camera 37, and detects the first stall lines 210A (step S3). Step S3 corresponds to the "stall-line detection step" of the present invention. While the case of detecting the first stall lines 210A from the captured image of the rear camera 37 is described in the embodiment, it is also possible to detect the first stall lines 210A from the captured images of the front camera 31, the left-side camera 33, and the right-side camera 35. The control unit 110 detects the stall line 210 from the captured image, and compares the length of the detected stall line 210 with the reference length set in advance to determine whether the detected stall line 210 is the first stall line 210A or the second stall line 210B. When the first stall line 210A cannot be detected from the captured image (NO in step S3), the control unit 110 returns to step S2 and acquires the next captured image from the memory 130. The next captured image is the following captured image in the order of the captured images by the rear camera 37 that captures the images at a prescribed frame rate.

Further, when the first stall lines 210A are detected from the captured image (YES in step S3), the control unit 110 determines whether or not both ends of the detected first stall lines 210A are detected (step S4). When the both ends of the first stall lines 210A, that is, the first ends 221 of the first stall lines 210A cannot be detected (NO ins step S4), the control unit 110 sets the first provisional parking frame 230A based on the second ends 222 (step S5). Further, when the both ends of the first stall lines 210A are detected (YES is step S4), the control unit 110 sets the second provisional parking frame 230B based on the first ends 221 (step S6). Step S5 and step S6 correspond to the "provisional parking frame setting step" of the present invention.

Then, the control unit 110 changes the position of the first provisional parking frame 230A or the second provisional parking frame 230B in the lateral direction of the stall 200 (step S7). Specifically, the control unit 110 changes the position of the first provisional parking frame 230A or the second provisional parking frame 230B such that the center in the lateral direction of the first provisional parking frame 230A or the second provisional parking frame 230B matches the center in the lateral direction of the stall 200 and that the longitudinal direction of the first provisional parking frame 230A or the second provisional parking frame 230B becomes parallel to the longitudinal direction of the stall 200.

Then, the control unit 110 acquires the detected results of the sonars 10 and the captured image of the imaging unit 30 (step S8). The control unit 110 determines whether or not there is the obstacle 310 based on the acquired detected results of the sonars 10 and the captured image (step S9). Specifically, the control unit 110 determines whether or not there is the obstacle 310 existing outside the first provisional parking frame 230A calculated in step S5 or the second provisional parking frame 230B calculated in step S6 and within a range in which a distance between the obstacle 310 and the first provisional parking frame 230A or the second provisional parking frame 230B is equal to or less than a set distance R1 (step S9). Step 9 corresponds to the "obstacle detection step" of the present invention.

When the obstacle 310 cannot be detected within the set distance R1 (NO in step S9), the control unit 110 shifts to the processing of step S11. Further, when the obstacle 310 is detected within the set distance R1 (YES in step S9), the control unit 110 calculates the third provisional parking frame 230C such that the distance between the third provisional parking frame 230C and the detected obstacle 310 becomes a distance R2 that has the larger value than the set distance R1 (step S10). Step S10 corresponds to the "provisional parking frame setting step" of the present invention.

Then, the control unit 110 sets the detection range 250 (step S11). The control unit 110 sets the detection range 250 based on the upper frame 231, the left frame 233, and the right frame 234 of the provisional parking frame 230 as has been described above by referring to FIG. 8.

Then, the control unit 110 detects the obstacle 310 in the set detection range 250, and generates the obstacle map 300 (step S12). Specifically, when the obstacle 310 is detected within the detection range 250 based on the detected results of the sonars 10, the control unit 110 rewrites the value of the data recorded on the storage cells of the obstacle map 300 corresponding to the position of the detected obstacle 310 from "0" to "1". Step S12 corresponds to the "map generation step" of the present invention.

After generating the obstacle map 300, the control unit 110 divides the detection range 250 into four divided areas that are the first divided area 261, the second divided area 262, the third divided area 263, and the fourth divided area 264 (step S13). For each of the divided first to fourth divided areas 261 to 264, the control unit 110 counts the number of cells where the value is rewritten to "1", and generates a histogram that shows the number of cells in each of the first to fourth divided areas 261 to 264 (step S14).

Then, the control unit 110 determines whether or not there is the wheel stop 330 based on the shape of the generated histogram (step S15). Further, when having determined that there is the wheel stop 330, the control unit 110 determines the position of the wheel stop 330 (step S15). Step S15 corresponds to the "wheel-stop detection step" of the present invention. When the wheel stop 330 cannot be detected (NO in step S16), the control unit 110 shifts to determination of step S18. Further, when the wheel stop 330 is detected (YES in step S16), the control unit 110 calculates the fourth provisional parking frame 230D based on the position of the wheel stop 330 (step S17). Step S17 corresponds to the "provisional parking frame setting step" of the present invention.

Then, the control unit 110 determines whether or not a plurality of the provisional parking frames 230 are calculated (step S18). When a plurality of the provisional parking frames 230 are calculated (YES in step S18), the control unit 110 selects one of the plurality of calculated provisional parking frames 230 (step S19). For example, the control unit 110 selects the provisional parking frame 230 at the distance closest to the own vehicle 1.

After selecting the provisional parking frame 230 (step S19) or when there is a single calculated provisional parking frame 230 (NO in step S18), the control unit 110 sets the parking position based on the provisional parking frame 230 (step S20). Step S20 corresponds to the "parking position setting step" of the present invention.

Then, the control unit 110 calculates the parking route along which the own vehicle 1 is moved from the current position to the parking position (step S21). The control unit 110 outputs the information showing the calculated parking route to the vehicle control unit 70 (step S22). The vehicle control unit 70 controls the drive mechanisms such as the engine, steering wheel, brakes, and transmission such that the own vehicle 1 is parked in the parking frame inputted from the parking assist apparatus 100.

As described above, the parking assist apparatus 100 of the embodiment includes the map generation unit 155, the wheel-stop detection unit 156, and the parking position setting unit 157.

The map generation unit 155 generates the obstacle map 300 that shows the positions of the obstacles existing in the surrounding of the own vehicle 1 based on the detected results of the sonars 10 equipped on the own vehicle 1, and records the data showing existence of the obstacles on the obstacle map 300.

The wheel-stop detection unit 156 divides the obstacle map 300 generated by the map generation unit 155 into a plurality of areas, counts the number of data pieces in each of the plurality of divided areas, and detects the position of the wheel stop based on the counted number of data pieces in each of the plurality of areas.

The parking position setting unit 157 sets the parking position for parking the own vehicle 1 based on the position of the wheel stop 330 detected by the wheel-stop detection unit 156.

The obstacle 310 of low height such as the wheel stop 330 is greatly influenced by vibration of the own vehicle 1 itself, so that the detection accuracy of the position by the sonars 10 may be deteriorated. Further, there may be cases where other obstacles than the wheel stop 330 may be mistakenly detected by the sonars 10. Thus, the obstacle map 300 where the detected results of the sonars 10 are recorded is divided into the plurality of areas, and the position of the wheel stop 330 is detected based on the distribution of the number of data pieces in each of the divided areas. This makes it possible to detect the position of the wheel stop 330 accurately without being influenced by vibration and misdetection. Therefore, by setting the parking position based on the detected position of the wheel stop 330, the own vehicle 1 can be parked at a preferable position within the stall 200.

Further, the parking assist apparatus 100 includes the image acquisition unit 151 and the stall-line detection unit 152.

The image acquisition unit 151 acquires the captured image captured by the imaging unit 30.

The stall-line detection unit 152 detects the stall lines 210 showing the stall 200 from the captured image acquired by the image acquisition unit 151, and identifies the first stall lines 210A extending in the longitudinal direction of the stall 200 from the detected stall lines 210.

The wheel-stop detection unit 156 divides the obstacle map 300 into a plurality of areas in the direction orthogonal to the extending direction of the first stall lines 210A identified by the stall-line detection unit 152.

In general, the wheel stop 330 is placed in parallel to the lateral direction of the stall 200. Therefore, the obstacle map 300 is divided into a plurality of areas in the direction orthogonal to the extending direction of the first stall lines 210A, and the position of the wheel stop 330 is detected based on the distribution of the number of data pieces in each of the divided areas. This makes it possible to specify the area where the wheel stop 330 is highly probable to exist from the plurality of divided areas, so that the detection accuracy of the wheel stop 330 can be improved.

Further, the parking assist apparatus 100 includes the provisional parking frame setting unit 153 that sets the provisional parking frame 230 for parking the own vehicle 1 based on the stall lines 210 detected by the stall-line detection unit 152.

The wheel-stop detection unit 156 sets the detection range 250 for detecting the wheel stop in a part of an area of the obstacle map 300 based on the position of the upper frame 231 extending in the lateral direction of the stall 200 out of the provisional parking frame 230 set by the provisional parking frame setting unit 153. The wheel-stop detection unit 156 divides the set detection range 250 into a plurality of areas, and counts the number of data pieces in each of the plurality of divided areas to detect the position of the wheel stop 330.

For example, the flap board is placed in the vicinity of the center of the stall 200 in the longitudinal direction, while the wheel stop 330 is placed at the end of the stall 200 in the longitudinal direction. Therefore, by setting the detection range 250 based on the position of the upper frame 231 extending in the lateral direction of the stall 200 out of the provisional parking frame 230 set by the provisional parking frame setting unit 153, the detection range 250 can be set in the area where the wheel stop 330 is highly probable to exist. Further, the area where the flap board exists can be excluded from the detection range 250, so that the detection accuracy of the wheel stop 330 can be improved.

When the both ends of the first stall lines 210A in the longitudinal direction are detected, the provisional parking frame setting unit 153 sets the second provisional parking frame 230B based on the first ends 221 at the distance farther from the own vehicle 1 out of the detected both ends. Further, when the first ends 221 are not detected, the provisional parking frame setting unit 153 sets the first provisional parking frame 230A based on the second ends 222 at the distance closer to the own vehicle 1.

Therefore, even in a case where the first ends 221 of the first stall lines 210A cannot be detected from the captured image of the imaging unit 30, it is possible to set the provisional parking frame 230.

Further, when the wheel stop 330 is detected by the wheel-stop detection unit 156, the provisional parking frame setting unit 153 corrects the position of the provisional parking frame 230 based on the position of the detected wheel stop 330.

Further, the parking position setting unit 157 sets the parking position based on the corrected provisional parking frame 230.

Therefore, it is possible to change the position of the provisional parking frame 230 based on whether or not the wheel stop 330 is detected by the wheel-stop detection unit 156. The parking position is set based on the changed provisional parking frame 230, so that it is possible to park the own vehicle 1 at a preferable position within the stall 200.

Further, there is also provided the obstacle detection unit 154 that detects the obstacle 310 based on at least one out of the captured image acquired by the image acquisition unit 151 and the detected results of the sonars 10.

When the obstacle 310 is detected outside the set provisional parking frame 230 and within a range in which a distance between the obstacle 310 and the provisional parking frame 230 is equal to or less than a set distance R1, the provisional parking frame setting unit 153 corrects the position of the provisional parking frame 230 such that the distance between the provisional parking frame 230 and the detected obstacle 310 becomes larger than the set distance R1.

Therefore, it is possible to change the position of the provisional parking frame 230 based on whether or not the obstacle 310 is detected by the obstacle detection unit 154. The parking position is set based on the changed provisional parking frame 230, so that it is possible to park the own vehicle 1 at a preferable position within the stall 200.

The embodiment described above only shows examples of aspects of the present invention, and any modifications and applications are possible without departing from the scope of the present invention.

For example, while the sonar 10 is shown in FIG. 1 as an apparatus corresponding to a sensor, the sensor is not limited to the sonar. The sensor may also be a millimeter-wave radar or a LIDAR (Light Detection and Ranging/Laser Imaging Detection and Ranging), for example.

Further, FIG. 1 is a schematic diagram in which the components of the parking assist apparatus 100 are classified according to the main processing contents in order to facilitate understanding of the invention of the application, and the configuration of the parking assist apparatus 100 can be classified into a still greater number of structural elements according to the processing contents. Further, a single structural element may be classified to execute still greater kinds of processing.

Further, when implementing the parking assist method according to the present invention by using a computer, the program to be executed by the computer may be configured as a form of a recording medium or a form of a transmission medium that transmits the program. A magnetic or optical recording medium or a semiconductor memory device can be used as the recording medium. Specifically, examples thereof may be portable or fixed recording media such as a flexible disk, an HDD (Hard Disk Drive), a CD-ROM (Compact Disk Read Only Memory), a DVD, a Blu-ray (R) Disc, a magneto-optical disk, a flash memory, and a card recording medium. Further, the recording medium may be a nonvolatile storage device such as a RAM, a ROM, or an HDD provided to the parking assist apparatus 100.

Further, the processing units of the flowchart shown in FIG. 13, for example, are divided according to the main processing contents in order to facilitate understanding of the processing executed by the parking assist apparatus 100, and there is no limit to be set on the present invention by the way the processing units are divided and the names thereof. The processing of the parking assist apparatus 100 can be divided into a still greater number of processing units according to the processing contents. Furthermore, as for the processing of the parking assist apparatus 100, a single processing unit may further be divided to include still greater kinds of processing.

REFERENCE SIGNS LIST

1 Own vehicle
5 CAN bus
10 Sonar
30 Imaging unit
31 Front camera
33 Left-side camera
35 Right-side camera
37 Rear camera
50 Navigation apparatus
70 Vehicle control unit
100 Parking assist apparatus
110 Control unit
130 Memory
131 Control program
150 Processor
151 Image acquisition unit
152 Stall-line detection unit
153 Provisional parking frame setting unit 154 Obstacle detection unit
155 Map generation unit
156 Wheel-stop detection unit
157 Parking position setting unit
158 Parking route calculation unit
200 Stall
210 Stall line
210A First stall line
210B Second stall line
221 First end
222 Second end
230 Parking frame
250 Detection range
261 First divided area
262 Second divided area
263 Third divided area
264 Fourth divided area
300 Obstacle map
310 Obstacle

What is claimed is:

1. A parking assist apparatus comprising:
a processor, wherein the processor
generates an obstacle map showing a position of an obstacle existing in a surrounding of a vehicle based on a detected result of a sensor equipped on the vehicle, and records data indicating existence of the obstacle on the obstacle map,
divides the obstacle map into a plurality of areas, counts a number of data pieces in each of the plurality of divided areas, and detects a position of a wheel stop based on the counted number of data pieces in each of the plurality of areas,
sets a parking position for parking the vehicle based on the position of the wheel stop,
acquires a captured image of the surrounding of the vehicle, and
detects stall lines showing a stall from the image and, from the detected stall lines, identifies a first stall line extending in a longitudinal direction of the stall, wherein
the processor divides the obstacle map into the plurality of areas in a direction orthogonal to an extending direction of the first stall line,
sets a provisional parking frame for parking the vehicle based on the stall lines,
sets a detection range for detecting the wheel stop in a part of an area of the obstacle map based on a position of a frame line extending in a lateral direction of the stall out of the provisional parking frame, divides the set detection range into the plurality of areas, and counts the number of data pieces in each of the plurality of divided areas to detect the position of the wheel stop, and wherein
when both ends of the first stall line in the longitudinal direction are detected, the processor sets the provisional parking frame based on a first end at a distance farther from the vehicle out of the detected both ends, and
when the first end cannot be detected, the processor sets the provisional parking frame based on a second end at a distance closer to the vehicle.

2. The parking assist apparatus according to claim 1, wherein
when the wheel stop is detected, the processor corrects a position of the provisional parking frame based on the detected position of the wheel stop, and
the processor sets the parking position based on the corrected provisional parking frame.

3. The parking assist apparatus according to claim 1, wherein the processor detects the obstacle based on at least one out of the image and the detected result of the sensor, wherein
when the obstacle is detected outside the set provisional parking frame and within a range in which a distance between the obstacle and the provisional parking frame is equal to or less than a set distance, the processor corrects the position of the provisional parking frame such that a distance between the provisional parking frame and the detected obstacle becomes larger than the set distance, and
the processor the parking position based on the corrected provisional parking frame.

4. A parking assist method comprising:
a map generation step of generating an obstacle map showing a position of an obstacle existing in a surrounding of a vehicle based on a detected result of a sensor equipped on the vehicle, and recording data indicating existence of the obstacle on the obstacle map;
a wheel-stop detection step of dividing the obstacle map generated by the map generation step into a plurality of areas, counting a number of data pieces in each of the plurality of divided areas, and detecting a position of a wheel stop based on the counted number of data pieces in each of the plurality of areas;
a parking position setting step of setting a parking position for parking the vehicle based on the position of the wheel stop detected by the wheel-stop detection step;
an image acquisition step of acquiring a captured image of the surrounding of the vehicle; and
a stall-line detection step of detecting stall lines showing a stall from the image acquired by the image acquisition step and, from the detected stall lines, identifying a first stall line extending in a longitudinal direction of the stall, wherein
in the wheel-stop detection step, the obstacle map is divided into the plurality of areas in a direction orthogonal to an extending direction of the first stall line identified by the stall-line detection step,
the parking assist method further comprising:
a provisional parking frame setting step of setting a provisional parking frame for parking the vehicle based on the stall lines detected by the stall-line detection step, wherein
in the wheel-stop detection step, a detection range for detecting the wheel stop is set in a part of an area of the obstacle map based on a position of a frame line extending in a lateral direction of the stall out of the provisional parking frame set by the provisional parking frame setting step, the set detection range is divided into the plurality of areas, and the number of data pieces in each of the plurality of divided areas is counted to detect the position of the wheel stop, and wherein
when both ends of the first stall line in the longitudinal direction are detected, in the provisional parking frame setting step, the provisional parking frame is set based on a first end at a distance farther from the vehicle out of the detected both ends, and
when the first end cannot be detected, in the provisional parking frame setting step, the provisional parking frame is set based on a second end at a distance closer to the vehicle.

5. The parking assist method according to claim 4, wherein
   when the wheel stop is detected by the wheel-stop detection step, in the provisional parking frame setting step, a position of the provisional parking frame is corrected based on the detected position of the wheel stop, and
   in the parking position setting step, the parking position is set based on the corrected provisional parking frame.

6. The parking assist method according to claim 4, comprising an obstacle detection step of detecting the obstacle based on at least one out of the image acquired by the image acquisition step and the detected result of the sensor, wherein
   when the obstacle is detected outside the set provisional parking frame and within a range in which a distance between the obstacle and the provisional parking frame is equal to or less than a set distance, in the provisional parking frame setting step, the position of the provisional parking frame is corrected such that a distance between the provisional parking frame and the detected obstacle becomes larger than the set distance, and
   in the parking position setting step, the parking position is set based on the corrected provisional parking frame.

* * * * *